United States Patent [19]
Zamiska et al.

[11] Patent Number: 6,157,929
[45] Date of Patent: Dec. 5, 2000

[54] SYSTEM APPARATUS AND METHOD FOR MANAGING THE USE AND STORAGE OF DIGITAL INFORMATION

[75] Inventors: James C. Zamiska, Montreal, Canada; Jeremy E. Mercer, Redmond, Wash.; Thomas P. Nadas, Montreal, Canada

[73] Assignee: Avid Technology, Inc., Tewksbury, Mass.

[21] Appl. No.: 08/842,551

[22] Filed: Apr. 15, 1997

[51] Int. Cl.[7] ..................................................... G06F 17/30
[52] U.S. Cl. .................... 707/200; 707/102; 707/104; 707/10; 707/9; 707/6; 348/6
[58] Field of Search .................. 707/200, 102, 707/104, 7, 103, 10, 9, 6; 341/155; 364/715, 235; 395/200; 386/27, 125; 348/6; 370/521

[56] References Cited

U.S. PATENT DOCUMENTS

| | | |
|---|---|---|
| 4,280,192 | 7/1981 | Moll ........................................ 700/200 |
| 4,412,306 | 10/1983 | Moll ........................................ 707/200 |
| 5,148,330 | 9/1992 | Duurland et al. ........................... 700/9 |
| 5,262,875 | 11/1993 | Mincer et al. ............................. 700/10 |
| 5,655,117 | 8/1997 | Goldberg et al. ........................... 700/9 |

*Primary Examiner*—Wayne Amsbury
*Assistant Examiner*—Thu-Thao Havan
*Attorney, Agent, or Firm*—Kenneth L. Milik

[57] ABSTRACT

A system, apparatus and method for managing the storage and use of digital information. The digital information can comprise both time-based information, such as digital video and digital audio, and static information such as 3D geometric models and/or still images. The invention employs data source records, information consumers, digital source information files, quality factor objects and other constructs with an information manager to manage storage and use of the information. All storage and/or use of the information is effected by making an appropriate request to the information manager which returns an appropriate result.

21 Claims, 6 Drawing Sheets

SYSTEM APPARATUS AND METHOD FOR MANAGING THE USE AND STORAGE OF DIGITAL INFORMATION

FIELD OF THE INVENTION

The present invention relates to a system, apparatus and method for managing the storage and use of digital information.

BACKGROUND OF THE INVENTION

Digital information, and especially digital multimedia information such as digital video, digital audio, motion capture information, three-dimensional geometric model and/or animation data, still image data, or any sequence of digital still images, is generally quite large in size. For example, a frame of CCIR 601 format digital video is approximately 1 Mbyte in size and, at the typical rate of 30 frames per second, a one minute clip of CCIR 601 video requires approximately 1.8 Gbytes of storage space. Generally, while such information can be relatively inexpensively stored on magnetic tape or the like, it must be transferred to random access storage systems (RAID drives, RAM memory, etc.) for use with many systems such as multimedia authoring or editing systems. Unfortunately, the random access storage devices used in storage systems for digital information are generally quite expensive and thus systems which must deal with large amounts of such digital information, such as multimedia authoring and/or editing systems and the like, are correspondingly expensive and/or suffer constraints in the amount of information which can be worked with at any one time.

Attempts have been made in the past to reduce the required amount of storage for multimedia authoring and/or editing systems by managing the multimedia information stored and used in these systems. For example, if a video clip is no longer being used in a project, it can be purged from the storage system to free storage space for other information. Another strategy for managing storage demands is to perform an initial edit pass using lower quality digital information (e.g. using compressed digital video or audio) which requires less storage space. For example, digital video can be compressed at ratios of 5:1 or more with a commensurate reduction in the required storage space. This approach takes advantage of the fact that an editing process often begins by working with ten or twenty times as much material as will be used in the final cut. Once the final edits are made, the low quality digital information can be replaced on the storage device with only those portions of higher quality information which are needed to produce the final edit.

However, problems exist with the prior art attempts to manage storage demands. In general, it is difficult to track usage of digital information to determine the portions of this information which are not used and which therefore may be purged. To exacerbate this problem, the information may be available at two or more different qualities on the storage device. Also, when two or more different projects use the same information, redundant copies of this digital multimedia information are often maintained in the storage device thus occupying space which might otherwise be usefully employed and in the prior art it has been difficult or impossible to identify such redundancies. Further, it is impractical, if not impossible, in prior art systems to automatically replace lower quality digital information in an intermediate edit with higher quality information to complete a final edit.

It is desired to have a system, apparatus and method for managing the storage and use of digital information which overcomes these problems of the prior art.

SUMMARY OF THE INVENTION

It is an object of the present invention to provide a novel system, apparatus and method for managing storage of and access to digital information which obviates or mitigates at least one disadvantage of the prior art.

According to a first aspect of the present invention, there is provided a method of managing the storage and use of digital information such as digital video, digital audio and the like, stored on at least one storage means for use by at least one information consumer, comprising the steps of:

storing digital source information files in the storage means, each source information file including at least one stream of digital source information;

creating a digital source information record for each stored digital source information file, each digital source information record including information to locate the digital source information file on said storage means, an indication of the quality of each stream in the digital source information and an indication of the duration of each stream in the digital source information;

creating and maintaining a three-dimensional array of information relating to digital source information records, the array indexing each stream in each digital source information record by its quality, by a time axis against which the start and duration of each stream of each stream is synchronized and by user defined groupings of streams;

receiving a request from at least one information consumer to use at least a portion of digital source information, the request being specified in terms of user defined groupings, the desired start time and duration of the information and a desired quality;

processing said request by examining said three-dimensional array to determine if a stream of said requested digital source information with the requested quality exists;

responding to the information consumer by providing information to allow access to at least a portion of a stream representing said identified digital source information when said determination indicates a stream containing the desired digital source information at said requested quality is available; and when said determination indicates that a stream containing said information at said desired quality does not exist, determining if a stream containing the requested digital source information at an acceptable substitute quality exists and responding to the information consumer with information to allow access to at least a portion of a stream representing the requested information at the said acceptable substitute quality and, when said determination indicates that the requested information does not exist at an acceptable substitute quality, responding to the information consumer with a tag indicating that the requested information is not available.

According to another aspect of the present invention, there is provided a system for managing the storage and use of digital information comprising digital source information files each including at least one stream of data, comprising:

storage means to store digital source information files;

at least one information manager to control access to and storage of said digital source information files, each information manager including a digital source information record pool to maintain a digital source information record for each digital source information file, a multi-dimensional array to index the digital source information records in said pool by a user defined grouping, by the quality of the information in the stream in the digital source information and by a common time reference for the start time and duration of the stream;

at least one information consumer to communicate with the information manager and to request access to digital source information therefrom at a specified quality and for a specified duration;and a quality matching engine to determine if digital source information is available at a requested quality and to determine if digital source information is available at an acceptable substitute quality if digital source information is not available at said requested quality.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

The present invention provides a system, apparatus and method for managing the storage and use of digital information such as digital video, digital audio, 3D geometric models, animations, and the like, which are stored in at least one random access storage means. This information is managed to improve use of the space on the storage means, to provide access to the information, to provide for simplified, yet efficient, purging of unused information from the storage means, to provide management of information which is stored at multiple resolutions/qualities and to provide best-fit matching to requests for information at unavailable qualities and to allow simple substitution of information at a higher quality for information previously in use at a lower quality. The present invention can be interfaced to capture systems, purge systems and a variety of information consumers.

While the following discussion relates largely to the use of the present invention with video editing and/or multimedia authoring systems, it will be apparent to those of skill in the art that the present invention is not limited to such uses and can in fact be favorably employed with a variety of applications which require random access to digital information. Such applications include medical diagnostic imaging and weather satellite and/or remote sensing amongst others.

Figure 1:
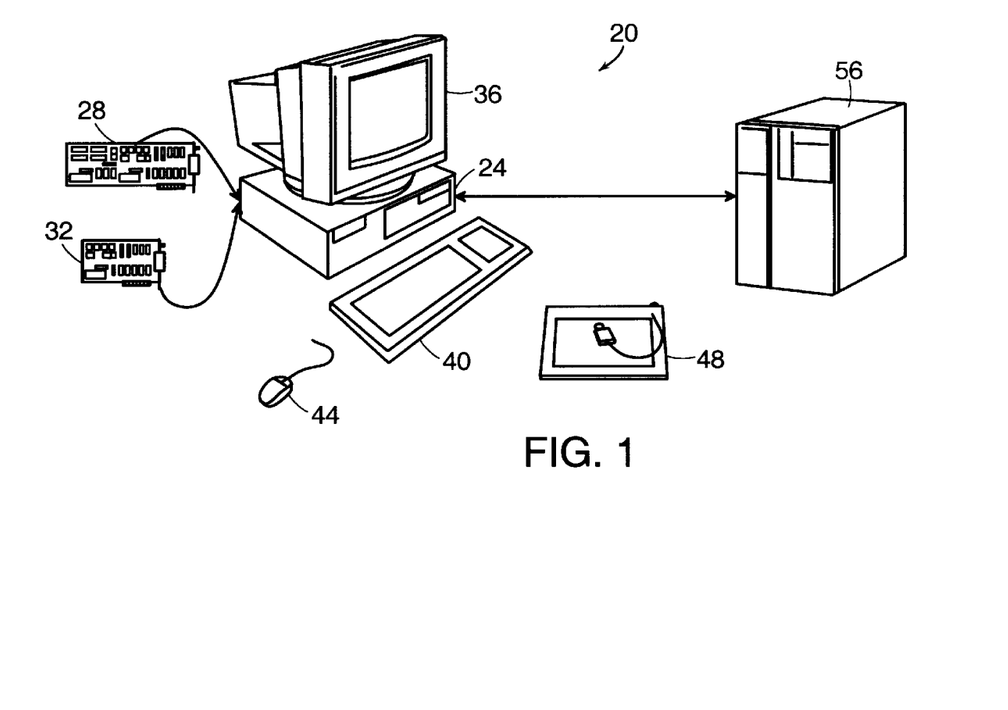
FIG. 1 shows a block diagram of the hardware used with an embodiment of the present invention.

A multimedia authoring and/or editing system and apparatus is indicated generally at 20 in FIG. 1. System 20 includes a general purpose computer 24, such as a personal computer with a 200 MHz Intel Pentium Processor executing the Windows NT v4.0 operating system. General purpose computer 24 is equipped with one or more appropriate special purpose peripheral processor cards, such as the DigitSuite video card set 28 manufactured by Matrox and a Kefren sound processing card 32 manufactured by Merging Technologies. A video display 36, such as a 21 inch NEC MULTISYNC monitor is operatively connected to computer 24, as is a keyboard 40, a mouse 44, a digitizer pad 48 and an audio playback system (not shown). If desired, computer 24 can also be connected to a digitally controlled video tape deck and audio tape deck.

Computer 24 is also operatively connected to a relatively large capacity random access storage means 56. In a presently preferred embodiment, storage means 56 comprises a RAID storage array, such as a model 6900 RAID storage device manufactured by Ciprico. Such RAID arrays are presently preferred as random access storage devices as they combine acceptable retrieval speed with large capacity, however any other suitable storage device can also be employed with the present invention, as will occur to those of skill in the art. In fact, in some circumstances, for speed or other reasons, digital information can be stored in RAM memory in computer 24 while one or more projects are being worked on or rendered with system 20. Accordingly, as used herein, the term "storage means" is intended to comprise a RAID storage device or the like, RAM memory in computer 24 and any other suitable random access storage techniques and/or devices wherein digital information can be maintained for use by system 20.

As will be understood by those of skill in the art, digital information is loaded onto storage means by a user as required. For example, video information from an analog source may be digitized to a desired resolution, or resolutions, and loaded onto storage means. Digital video information can be transferred directly to storage means, from optical disc, tape or other storage media, or via a network connection, or can be re-sampled to a different quality. Similarly, audio source information, still image source information, and any other desired source material can be digitized, if necessary, and loaded onto storage means as desired. The loading of information onto a storage means is accomplished by a process referred to herein as a capture process and is described below or as the result of an intermediate rendering of an effect or the like, as is also described below.

In the case wherein computer 24 is executing an appropriate multimedia authoring and/or editing program, digital multimedia information is read from storage means and edited and/or rendered and/or written back to storage means as desired, under the control of a user working at editing workstation 34. Once an edit has been completed with system 20, the resulting multimedia work, often referred to as a 'title', can be rendered, either in real time or otherwise, and stored in storage means and/or written to an appropriate storage media, not shown, such as an optical disk, a digital video/audio tape, etc.

As described in detail below, in the present invention when a capture system is capturing original source information, such as video tapes, audio CDs, film reels, etc.

and/or information stored locally on the workstation to digital source information files 100, the present invention creates and/or updates an information manager for the source information. As used herein, the term digital source information is intended to comprise both information captured from another source, such as a video tape, film reel , etc. and digital information produced by an effect or the like, such as a dissolve or filter effect.

In particular, the present invention: (i) creates a digital source information (DSI) record for each captured digital source information file, the DSI record being placed in a data source pool within the information manager; (ii) creates and/or updates a data cube within the information manager to reflect the DSI records in the data source pool; (iii) associates appropriate quality factors with the digital source information; and (iv) creates a log clip object and a master clip object that represents a group of portions of source information that can be presented to end users as a proxy object for representing, accessing, organizing and annotating the source information.

Another circumstance wherein an information manager is created and maintained is to manage digital source information produced as intermediate renderings in a multi-media editing/authoring system. Specifically, it is not uncommon when editing multimedia data that an effect need be produced for incorporation in the edit. For example, a dissolve between two video clips may be desired by the user. Such effects are generally computationally expensive to implement and can not always be rendered in real time. In the present invention, such effects can be rendered and these renderings managed by an information manager. It is presently preferred that intermediate renderings be managed by a separate information manager to separate the management of such edit-specific intermediate renderings from the management of the source information, especially as such source information can be shared between projects and/or edits.

Figure 2:
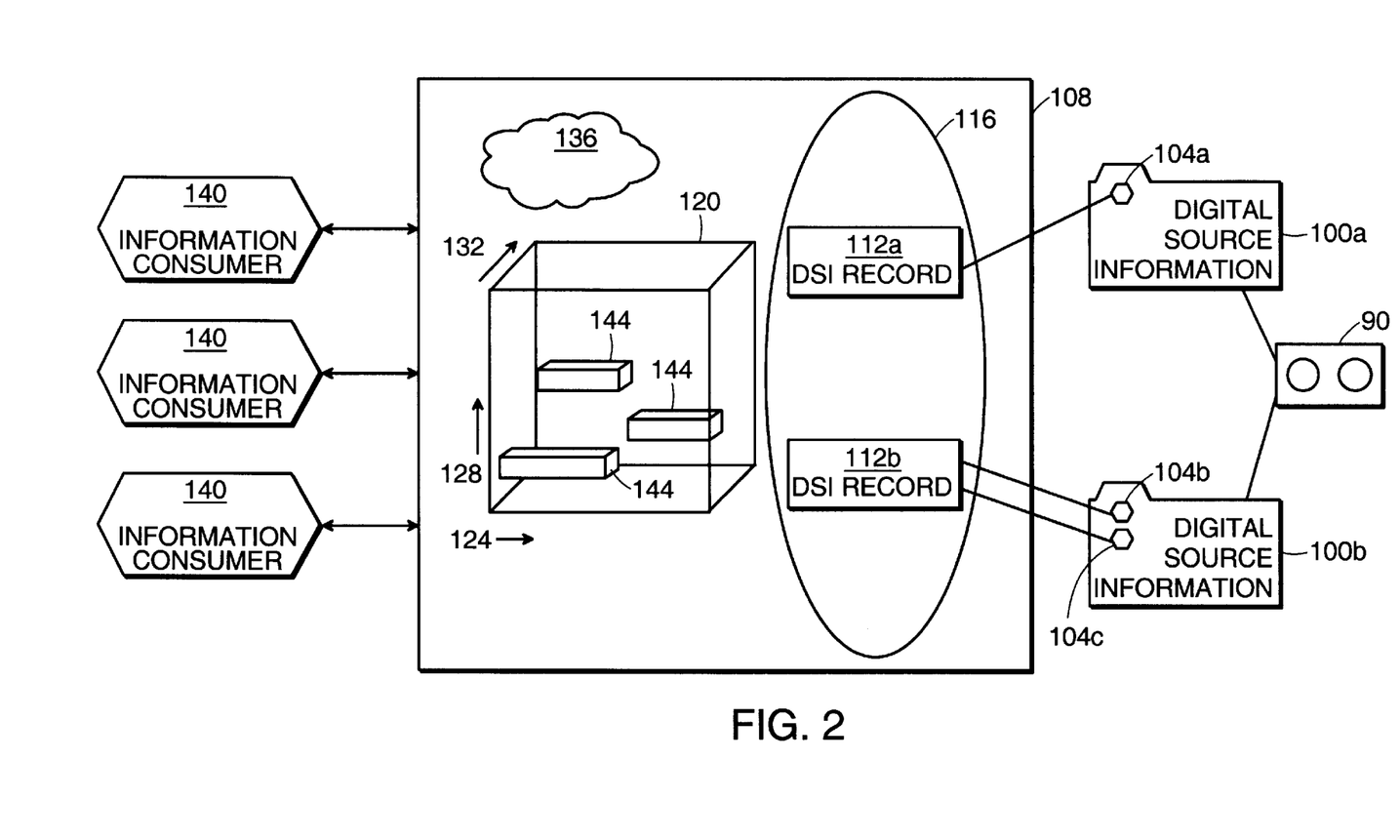
FIG. 2 shows a block diagram of an information manager employed in an embodiment of the present invention.

FIG. 2 shows an embodiment of the present invention wherein source material 90 supplied on external media such as video tape, film reel, digital audio tape, etc, is captured for use with the present invention. A user begins the capture process by creating or selecting an object in the digital authoring environment that represents a specific source of media (e.g. a specific film reel ) and creates the above-mentioned log clips that represent portions of that external source media. As used herein, the term log clip represents a data element which provides a user interface element corresponding to a portion of digital source information which is available to, or can be available to, the user. As shown in FIG. 2, the capture system, as directed by the user, digitizes the source material 90 and loads the resulting digital source information files 100 onto a storage means. Depending upon the data, the capture process can comprise the digitization (capture) of analog data such as analog video or audio information, the transfer of digital source information from a linear storage media or a network to the storage means, etc.

To support multiple transfers, for example from one film reel to two or more digital video tapes which are then captured, the capture system can employ SMPTE, Kodak Keykode or other timestripe information in the capture process to determine and maintain the relative time relationships of source materials.

Before loading source material in the capture process, the user must select one or more desired qualities for the digitization process and, as described below, a corresponding quality factor is assigned to the information. Typically, the capture system is capable of precisely controlling the digitization process such that it can repeatably digitize the media identified by a log clip at a specified quality and each digitization will produce identical digital media.

When the capture process is performed initially, the present invention creates an information manager 108 (described below) that represents a specific source of media (e.g. a specific film reel, video tape, etc.). In the event that an information manager 108 has already been created for the specific source material, the capture system will update the information manager 108 to reflect the additions effected by the capture system.

Each of the digital source information files 100 can include one or more streams 104 of digital information. For example, if a digital source information file 100 is an AVI format file, it may contain a video information stream and left and right audio information streams. In another example, CCIR 601 format digital video can include a digital video stream and up to eight streams of audio data. In other cases, a digital source information file 100 can include motion capture information streams, close captioning data streams, still picture streams, 3D animation streams, etc. In FIG. 2, digital source information file 100*a* contains a single stream 104*a* and digital source information file 100*b* contains two streams 104*b*, 104*c*.

A digital source information (DSI) record 112 is created for each digital source information file 100. Each DSI record includes: an ID identifying the format of the digital source information, i.e.—AVI video, AVI audio, WAVE, TIFF, MPEG, CCIR 601 video, etc.; the location of digital source information file 100, i.e.—a path in a file system on the storage means, an URL for a file on the World Wide Web, a range of memory addresses, etc.; and a flag indicating if the DSI record 112 is the primary owner of the digital source information file 100, as described below. A DSI record pool 116 holds the DSI records 112 within information manager 108.

Each DSI record 112 includes at least one structure referred to herein as a 'chunk' and each chunk contains information which corresponds to a stream 104 of digital information in the corresponding digital source information file 100 and each DSI record 112 includes a chunk for each stream 104 in its corresponding digital source information file 100.

Each chunk in a DSI record 112 includes: a unique ID for the corresponding stream in digital source information file 100; a quality factor ID (described below in more detail) corresponding to the quality factor object chosen above which identifies the quality of data in the stream 104; a start time and duration of the stream 104. Each chunk in a DSI record 112 also includes an entry indicating the corresponding channel, described below, in data cube 120, in which its corresponding stream has been grouped. In FIG. 2, DSI record 112*a* has been created for digital source information file 100*a* and includes a chunk corresponding to stream 104*a*, DSI record 112*b* has been created for digital source information file 100*b* and includes a chunk corresponding to stream 104*b* and a second chunk corresponding to stream 104*c*.

In addition to DSI record pool 116, the second major component of information manager 108 is data cube 120. As shown, data cube 120 is a four-dimensional array wherein a first axis 124 represents Time, a second axis 128 represents Quality Factors and a third axis 132 represents Channels of digital source information. As used herein, the term array is intended to encompass any structure or arrangement whereby data can be organized with respect to a multicriteria space and is not intended to be limited to a specific programming language provided data array or the like.

As used herein, a "channel" corresponds to a category of information used to group one or more related streams 104 of digital information. Specifically, when an information manager 108 is used to manage source media, a channel is a group defined and/or specified during the capture process for each stream 104 within each digital source information file 100. When used to manage a cache of digital source information representing a cache of intermediate renderings of effects or other intermediate information in a project or edit, a channel is associated with each rendering cache operator within the project or edit. For example, a rendering cache operator in a project can manage a cache of effects for a first video clip "A" and another rendering cache operator can manage effects for a second video clip "B" and each of these caches will be a separate channel in an information manager 108.

When initially defined, each channel is assigned an ID which identifies the type of digital information represented within the channel such as video, audio, etc. and a unique name which identifies the channel. For example, an information manager 108 might have three channels defined for a video about a group of musicians: a first channel, CH_AUDIO, "Guitar" for a musical audio stream; a second channel, CH_VIDEO, "Musicians", for a digital video stream; and a third channel, CH_AUDIO, "Narration", for a voice audio stream. In this ID configuration, the unique name of each channel is enclosed in quotes after the tag identifying the type of data.

The identification of the type of information and the assignment of names and channels can be accomplished during the capture process by explicit input by the user, implicit input (i.e.—an audio capture can only produce audio information) or a combination of both. Channels can be created, as desired, during the capture process or digital source information can be assigned to existing channels in the information manager, as desired.

As part of the capture process, the relative time of digital source information in a channel is defined. For example, if two or more portions of a video tape are captured to a single channel, the relative time locations of the portions on the tape are reflected by the start times of their corresponding chunks in the DSI record 112, recorded with respect to time axis 124. Time axis 124 of data cube 120 serves as a common reference for synchronizing the various streams 104. Each stream 104 has a start time, defined relative to time axis 124, and a duration and these two values are indicated in the corresponding chunk of the DSI record 112 defined for the digital source information containing the stream 104.

Generally, the times of one or more streams in a channel are mapped to the time axis 124 of data cube 120. For example, if source information 90 comprises three half-hour reels of film which are captured to three digital source information files 100, time axis 124 will have a ninety minute length, to which each stream 104 in each digital source information file will be referenced. For example, a stream 104 which was captured from the first three minutes of the second film reel will be positioned at from time t=31 minutes to t=34 minutes on time axis 124. The granularity of time axis 124 can be set as appropriate and, in a present embodiment of the invention, has a nanosecond granularity.

The determination of the start time and duration for stream can be made from time information which is available in the stream, (timecode striping on a videotape, for example) or explicitly supplied by the user.

The quality factor axis 128 of data cube 120 is used to organize information which is available at different qualities. The third major component of information manager 108 is Quality Factor Engine (QFE) 136 which comprises a collection of at least all of the defined quality factors for each type of digital source information managed by information manager 108 as well as a quality matching service, described below in detail. In an embodiment of the present invention, QFE 136 also includes a quality factor cache (QFX) for each information consumer. These QFX's maintain the quality matching heuristics, described below, which are defined for each information consumer.

In a present embodiment of the invention, quality factors are defined as a set of name and value pairs. For example, a quality factor for a digital audio source can comprise three name and value pairs, "Sample Rate—44,100; Bit Depth—16; Compression—ADPCM". Each unique quality factor, as defined by a unique set of name and value pairs, is assigned a unique quality factor ID which the present invention employs to simplify the tagging of streams in a data source with quality factors. Thus, digital audio information at a quality factor of "Sample Rate—44,100; Bit Depth—16; Compression—ADPCM" will be stored at a different position with respect to quality factor axis 128 than would the same data at a quality factor of "Sample Rate—24,000; Bit Depth—16; Uncompressed".

Figure 3:
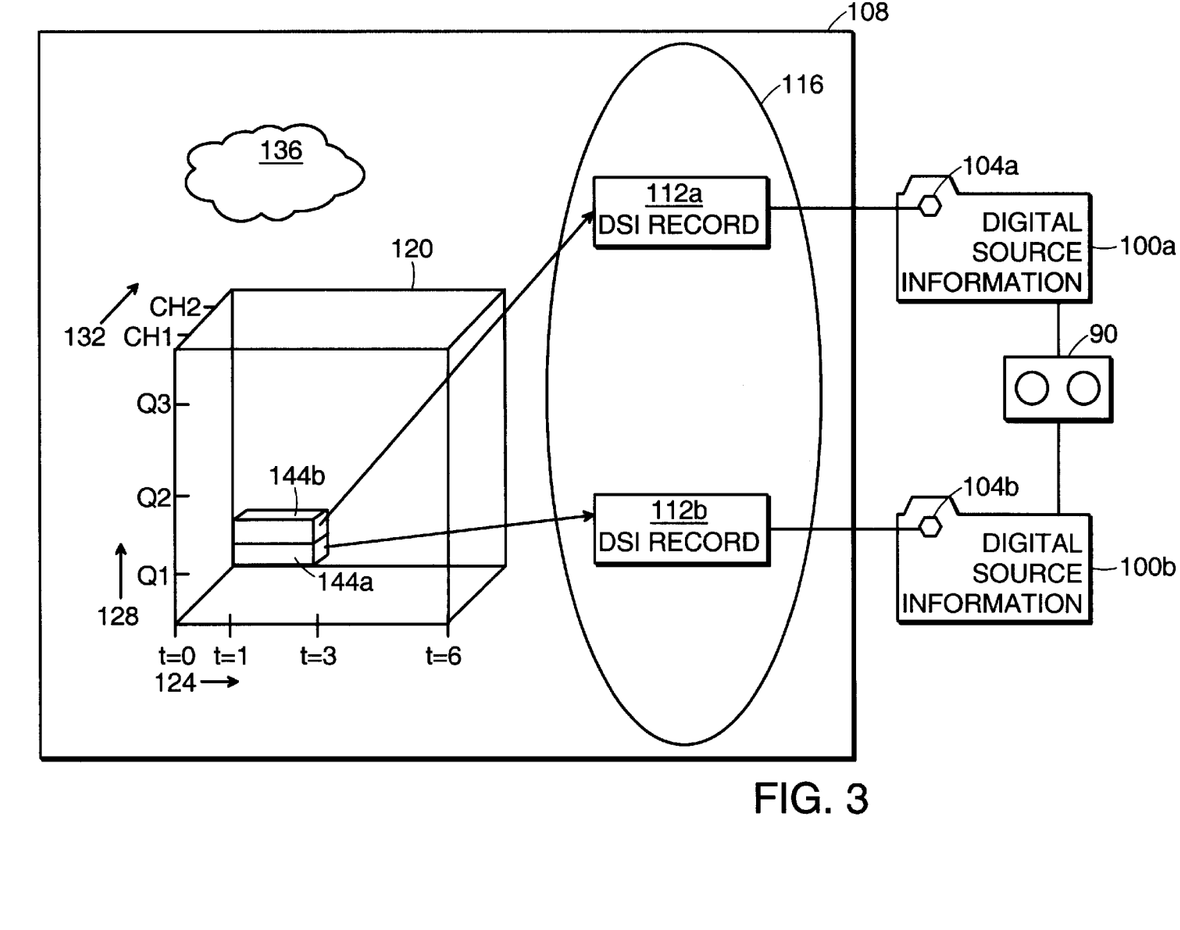
FIG. 3 shows another block diagram of an information manager employed in an embodiment of the present invention.

The data cube 120 effectively has a fourth axis which is used to maintain a record of the order in which similar streams 104 have been loaded into cube 120. Entries in data cube 120 are maintained by placement of an identifier block 144 with respect to the axes of data cube 120. The above-mentioned fourth axis is reflected in the vertical stacking of identifier blocks 144 at a location. As best seen in FIG. 3, identifier blocks 144a and 144b correspond to DSI records 112a and 112b respectively, which represent streams 104a and 104b, respectively, of the same information wherein stream 104b represented by identifier block 144b was entered into information manager 108 more recently than stream 104a represented by identifier block 144a.

The fourth axis of the data cube 120 allows the data cube 120 to manage sets of multiple, overlapping information for a given quality, channel and time window. When digital source information is added to information manager 108, the identifier block 144 is put at the top of a stack of identifier blocks 144 for that information. Given two streams 104 that were added to information manager 108, the stream that was added later is considered as representing the more recent information. In an alternative embodiment, an identifier can be provided to information manager 108 when digital source information for overlapping information is added, the identifier providing an indication of the relative chronology of the digital source information and information manager 108 can stack identifier blocks in accordance with the chronology established by this identifier.

In either case, information manager 108 can thereby determine the most recent stream 104 of a set of multiple, overlapping streams 104 by examining the stacks of relevant identifier blocks 144 and determining how higher (newer) identifier blocks 144 occlude portions of lower (older) identifier blocks 144. The process of managing the time ordering of the blocks is referred to by the present inventors as "information occlusion", wherein older information is occluded by newer and is believed to be especially useful when information manager 108 is managing intermediate renderings of effects, etc.

In a preferred embodiment of the present invention, data cube 120 is implemented as a four dimensional array. The array contains pointers and data objects required to implement the functionality of data cube 120 and the indices of the arrays correspond to the axes of data cube 120.

Having digitized and/or transferred the source information to one or more digital source information files 100 and created a DSI record 112 for each digital source information file 100, the capture process is completed as data cube 120 is updated with identifier blocks 144 to reflect the captured source information. As mentioned above, the capture process creates a log clip object for a logical grouping of information of the digital information source file 100 and this log clip represents a set of time windows onto the digital source information 100 and a set of channels within data cube 120, without regard to any specific digitization data quality. For example, a log clip can identify a portion of video and associated audio captured at any resolution and a user can interact with this log clip, through an appropriate GUI interface, as desired. Each use of the log clip will then initially refer to the same set of time windows and channels of the log clip's digital source information file 100.

As will be apparent to those of skill the art, the capture process can follow the above-described steps except for the digitizing of the source information 90 media and storing digital source information files 100. This results in log clips which are 'placeholders' for specific source information which has not yet been digitized. The user may capture the media for such log clips, or for the corresponding placeholder clips in a project, at a later time. This process is referred to as "recapture".

All access to streams 104 in digital source information 100 by information consumers 140 is managed by information manager 108. An information consumer 140 is any process or object which requires access to digital information and can, for example, be a clip object manipulated in a NLE-based post production video editing system, etc.

To work with capture systems, purge systems, information consumers 140 and any other system which requires access to and/or information regarding digital source information, information manager 108 provides a set of operations for managing digital source information 100 including: adding digital source information 100 to information manager 108; removing digital source information 100 from information manager 108; replacing existing digital source information 100 in information manager 108 with newly captured digital source information 100; and enumerating a series of one or more digital source information files 100 that can supply digital information for a specified time window and channel of information manager 108, at a data quality known to information manager 108.

Information manager 108 also provides operations on quality factors, including storing and/or removing quality factors in QFE 136 and enumerating the quality factors at which information manager 108 can supply digital information within a specified time window of the information manager and a specified channel of the information manager.

Figure 4:
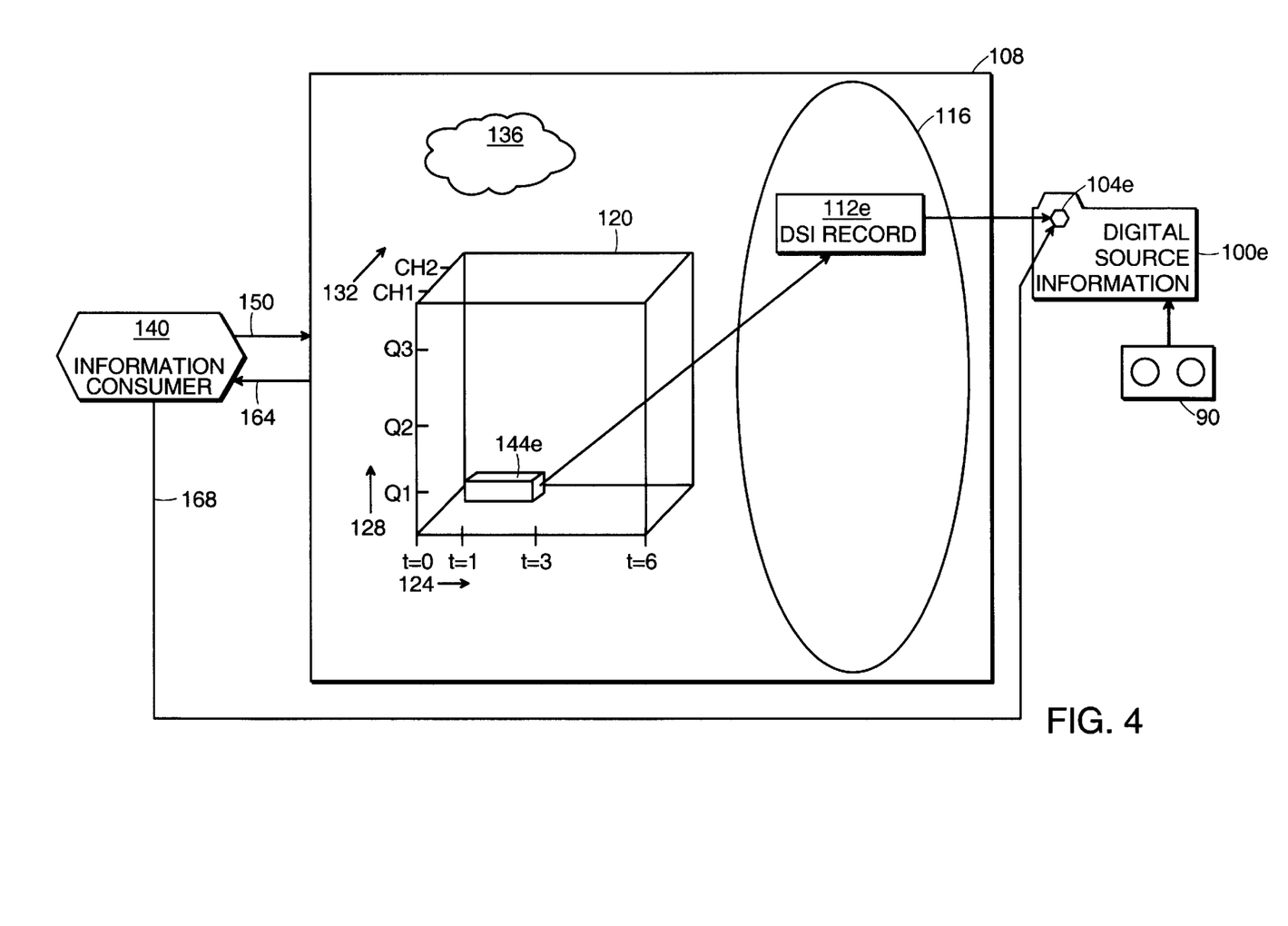
FIG. 4 shows another block diagram of an information manager employed in an embodiment of the present invention.

FIG. 4 shows an example of how information manager 108 manages information supplied by one digital source information file 100. In this example, information manager 108 is managing source material external to the authoring workstation, such as a video tape 90, containing raw footage of some event. Initially, the capture system creates the information manager 108 to manage source material of this particular video tape.

As part of the capture process, the user selects a quality at which the source material is to be digitized. Typically, this quality is selected from a set of quality factors which have previously been defined for the relevant types of source material, with different quality factors applying to video, audio and other source information types. Quality factors are independent of the type of source information, for example a quality factor of QI for video may represent, for example, 10:1 compressed, 720×486 pixel resolution quality while Q1 for audio may represent, for example, Sample Rate—44,100; Bit Depth—16; Compression—ADPCM. If QFE 136 in information manager 108 did not already have a quality factor object with the desired set of characteristics, one can be created by the user, added to the collection in QFE 136 and used during the capture process.

In FIG. 4, the capture system has digitized a portion of video tape 90 corresponding to the video from time t1 to time t3 of information manager 108, creating digital information file 100e shown in FIG. 4, which includes one stream 104e of digital video. As is discussed above, information manager 108 provides the capture system with a mechanism for mapping the time offsets of video and/or audio on the tape to a common time axis 124. In this example, wherein a single source material 90 is managed, time axis 124 directly corresponds to the time base of video tape source material 90.

The capture system has Information manager 108 create an identifier block 144e which is placed in channel CH1 (which can for example be defined as "CH_Video, Event") at quality factor Q1 from time t=1 to time t=3 representing the stream 104e in digital source information file 100e. As is explained above, identifier blocks 144 are a computational mechanism that permits information manager 108 to supply the most recent digital information available at a given quality and channel, and permit it to easily answer such queries as "what DSI records supply digital information for a given time window, channel and quality of the information manager?" and "is there any digital source information missing within a given time window, quality and channel of a information manager?" This organization also permits the information manager 108 to easily answer such queries as "provide a list of qualities at which there is any digital source information available for a given time window and channel of the information manager".

In FIG. 4 there is only one DSI record 112e in data source pool 116 and it has only one chunk, so there is only one identifier block 144e in data cube 120. Identifier block 144e has one time window onto the chunk in DSI record 112e which supplies it with digital source information from stream 104e. This time window starts at zero time of the chunk and extends for 2 seconds duration, the duration of the chunk. Identifier block 144e in turn has a start time t1 relative to time axis 124 of data cube 120 and has a duration of 2 seconds.

When an information consumer 140 requests 160 from information manager 108 any digital source information available from time t1 to time t3, at a requested quality that exactly matches quality Q1 and along channel CH1, information manager 108 examines data cube 120, using it's axes, to locate identifier block 144e within channel CH1, at quality Q1 and provides to information consumer 140 information 164 that it will require to access stream 104e. Information 164 provided to information consumer 140 is essentially a copy of the portions of DSI record 112e which relate to stream 104e. Information consumer 140 then uses information 164 to access 168 stream 104e directly.

Figure 5:
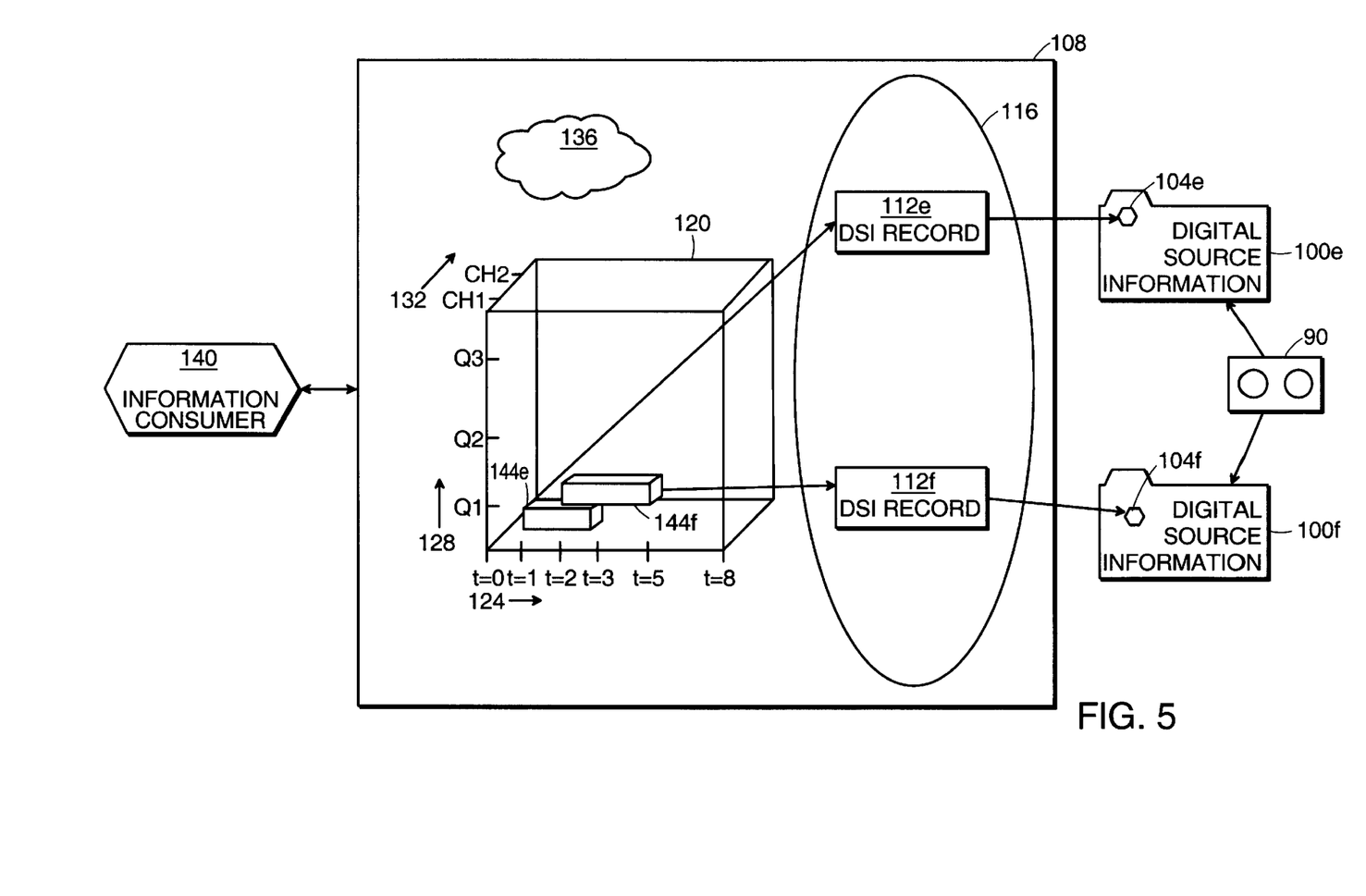
FIG. 5 shows the information manager of FIG. 4 wherein occlusion of an identification block in the information manager is occurring.

If another portion of video tape 90 is subsequently captured by the capture system, information manager 108 is updated as shown in FIG. 5. Specifically, another portion of video tape 90 corresponding to the window from time t2 to time t4 is captured to a digital source information file 100f which includes stream 104f representing the digital information. The user has instructed the capture system to digitize this information at a quality factor of Q1 and the information is designated as belonging to channel CH1. Following the steps outlined above, and in accordance with the information provided by the capture system, information manager 108 adds a DSI record 112f to data source pool 116 and adds an identifier block 144f to data cube 120 at quality Q1, in Channel CH1 for the time of t=2 to t=5.

Streams 104e and 104f both happen to provide digital information for time t2 to time t3 at quality Q1 on channel C1 and thus identifier block 144f is stacked on top of identifier block 144e with the two blocks overlapping on time axis 124 for t=2 to t=3. In the present invention, it is assumed that a more recently added identifier block (the topmost block at any given point) represents more up-to-date information than an identifier block added earlier. Thus, for the time window t2 to t3, the digital information in stream 104f, represented by identifier block 144f, will be made available in response to requests from information consumers 140. Thus, the time window of t=2 to t=3 for stream 104e is occluded by identifier block 144f for stream 104f.

Generally, occlusion is not very important for the case wherein an information manager 108 represents only static sources of digital information such as a video tape. However, as is discussed in more detail below, it is believed to be a very effective mechanism for information managers 108 which manage cached digital information, such as intermediate renderings generated by an authoring system, because the digital information changes over time.

If an information consumer 140 requests from information manager 108 digital information for channel CH1 at a requested quality that exactly matches the quality factor Q1, from time t1 to t4, a portion of DSI record 112e to allow access to time t=1 to t=2 of stream 104e is copied to information consumer 140 as is a portion of DSI record 112f to allow access to time t=2 to t=5 of stream 104f.

Figure 6:
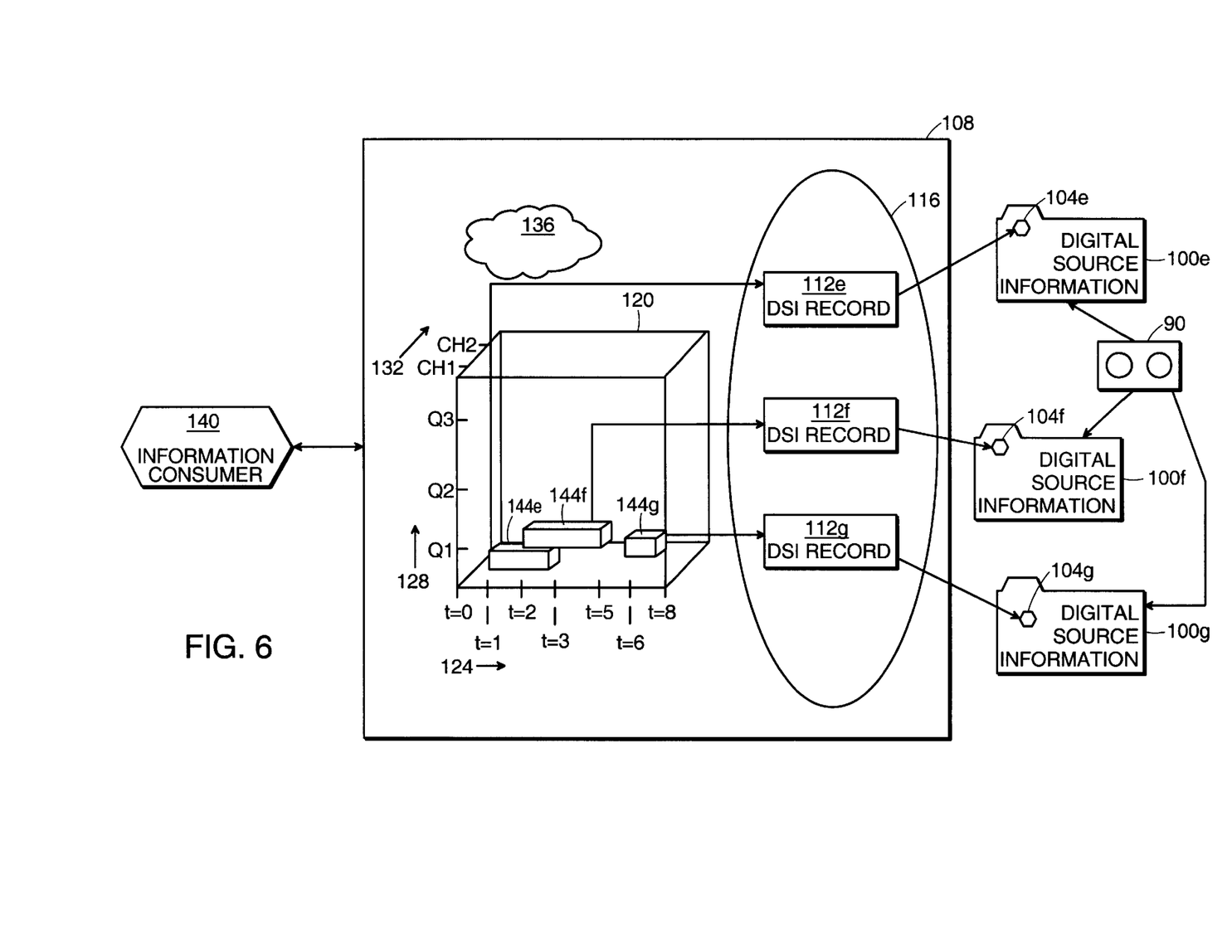
FIG. 6 shows the information manager of FIG. 5 which has had more information added.

FIG. 6 shows the information manager of FIGS. 4 and 5 wherein a portion of video tape 90 representing time t=6 to t=8 has been digitized by the capture system to a digital information source file 100g which includes a single stream 104g. During the capture process, it has been specified that this information is to be captured at quality Q1 to channel CH1. The capture system provides the necessary information to information manager 108 which creates DSI record 112g and places an identifier block 144g at the appropriate location in data cube 120, with respect to the four axes of data cube 120. As is apparent, there is a gap between identification blocks 144f and 144g and this gap corresponds to the absence of digital information for the time t=5 to t=6 at quality Q1 and channel C1 of information manager 108.

If an information consumer 140 now requests digital information from channel CH1, at quality Q1 for time t=1 to t=8 from information manager 108, data cube 120 is examined by information manager 108 which determines the appropriate response to the information consumer 140. Specifically, in this example information manager will copy a information from DSI record 112e to provide access to stream 104e for time t=1 to t=2 and from DSI record 112f to provide access to stream 104f for time t=2 to t=5. Information manager 108 will then provide a special tag indicating that no information is presently available from time t=5 to t=6 at Q1 for channel CH1 and will complete the request by copying information from DSI record 112g to provide access to stream 104g from time t=6 to t=8.

Although the examples above discuss the management of digital information on only one channel and at only one quality, it will be apparent to the reader that the above mechanisms apply equally well when there are information sources in an information manager 108 at multiple qualities and on multiple channels. Furthermore, any information source that is added to information manager 108 may include information in one or more streams 104 at any quality and for any channel. In all cases, identification blocks 144 are used to represent contiguous information supplied by non-occluded portions of one or more data streams 104. Further, in all cases each identification block 144 exists on exactly one channel and at one quality factor, extends for some non-zero duration, and represents a duration for which data is available.

The fact that a DSI record 112 added to a information manager 108 can have more than one chunk allows information manager 108 to handle digital source information files 100 which supply multiple streams 104 of data, each with a distinct offset from the beginning of the file and/or assigned to a different channel and/or at a different quality. For example, a given digital source information file 100 can supply both audio and video streams 104 and, because each identification block 144 is located on one channel and quality factor, a DSI record 112 for information supplied from a multi-stream digital information source 100 can supply information to as many identification blocks 144 on as many channels and qualities of data cube 120 as there are chunks in the DSI record 112.

Any digital source information file 100 for which a DSI record 112 exists within the data source pool 116 of an information manager 108 can be removed from information manager 108. When a digital source information file 100 is removed from an information manager 108, the corresponding DSI record 112 is removed from data source pool 116 and the identification blocks 144 in data cube 120 are updated to reflect the set of non-occluded information which remains available after the remove operation. The remove information operation is thus the inverse of the add information operation, and supports such processes as purging unneeded information from the storage means, and supports "undo" operations if information manager 108 is used to manage a rendering cache. Because the identification blocks 144 in data cube 120 always span the extent of all available information, the operations of adding and removing digital information source files 100 to the information managed by information manager 108 cause the identification blocks in data cube 120 to grow or merge with neighboring identification blocks or to split into smaller identification blocks 144.

Information manager 108 also supports the operation of replacing digital source information files 100 and this operation preserves the relative position of a identification block 144 within the stacked order of identification blocks, but allows modification of any of the other characteristics stored in the corresponding DSI record 112, such as a chunk's start time, duration, channel or quality.

The information manager 108 and its contents (QFE 136, data cube 120 and data source pool 116) can be stored in non-volatile memory, such as in a file on a disk drive, to provide a persistent record of the information it is managing. Thus, an existing information manager 108 can be loaded from persistent storage to serve information consumer 140 queries about information quality and availability. Also, an information manager 108 can be loaded from persistent storage, adding or removing DSI records 112 and identification blocks 144 in the information manager 108 corresponding to newly available information or information that has been removed, and the resulting, updated information manager can then be re-written to the persistent storage.

It should be noted that the act of adding and/or removing information sources in an information manager 108 does not, in itself, save the information manager 108 to persistent storage. The fact that the operations of adding and removing digital source information files 100 are non-destructive and the results of the modifications to an information manager made since the information manager was last loaded from persistent storage may themselves be persisted to disk or discarded, is believed to provide a distinct advantage when the information manager is used to manage a rendering cache for a project while it is being editing by a multimedia authoring system.

As described above, information manager 108 is located between information consumers 140 and digital source files 100 on one or more storage means. Information consumers 140 can be any process or object which requires access to digital information and, when the present invention is used to manage information in a multimedia editing/authoring system, they can be clips used within that system. In the following discussion, multimedia information "edits" comprise one or more time lines in a nonlinear editing (NLE) paradigm within an edit/authoring project. These time lines comprise clips and/or other information consumers of digital source information. In the present invention, a user can be working on a variety of time lines, such as a video editing time line and corresponding left and right audio editing time lines, and each of these time lines can include a variety of clips of digital information, each of which clips is referred to herein as an information consumer 140.

Once an information manager 108 is managing some set of digital information, a project created by a multimedia editing/authoring application gains access to that digital information by way of information consumer 140. In the present invention an information consumer gains access to digital information managed by an information manager in accordance with the following:

(i) an information consumer 140 is always associated with one specific information manager 108;

(ii) the information consumer 140 is associated with a specific channel and time window of its information manager 108, but is not by itself associated with any specific set of digital source information files 100 or qualities of information;

(iii) the start time and duration of the information consumer's time window onto its information manager 108 may be altered to reflect the portion of the digital source information 100;

(iv) an information consumer 140 maintains a persistent link to its information manager 108 (e.g. an OLE moniker to the information manager 108) which allows the information consumer 140 to connect to its information manager 108 when loaded;

(v) an information consumer 140 is persisted inside a project file which typically is distinct from the file within which information manager 108 is persisted;

(vi) the information consumer 140 can query its information manager 108 to determine the qualities at which the information manager can provide digital information for the information consumer's channel and time window; and (vii) the information consumer requests digital information at a specific quality for its channel and its time window from information manager 108 and the information manager 108 provides a time-ordered list of one or more streams 104 representing the digital source information it is managing with those exact specifications or with the closest matching quality to those specifications, or tagging time windows of the specified channel and quality for which no digital information is available, as described above.

Information manager system 108 also provides that two or more information consumers 140 can use the same stream 104, or portion of a stream 104, without requiring replication of that stream 104 on the storage means.

Given a system such as that described above which can supply access to one or more possibly overlapping qualities of digital information representing multiple digitizations of the same source material 90, it is possible that the information manager does not contain digital information at a desired quality but does contain the desired information at a higher or lower quality. To provide a mechanism whereby a given information consumer 140 can be provided with a different, available, quality of information, the present invention provides a quality matching service within quality factor engine 136. This service employs the quality factors described above in a framework into which quality matching heuristics can be installed as needed by each information consumer 140 via the above-mentioned QFX's or by a class of information consumer 140 via a class QFX. For example, information consumers 140 for video data can, as a class, have one set of heuristics while information consumers 140 for audio information will likely have another. Further, information consumers 140 for video information can have different sets of heuristics, for example, depending upon whether they are for motion picture quality video, broadcast quality video, etc.

In order to provide the matching heuristics, quality factors are ranked, in any suitable manner, as will occur to those of skill in the art. For example, three qualities of digital video information might be used in a system, where each might have the following characteristics and be identified respectively by the quality factor IDs "Q1", "Q2" and "Q3". Quality Factor "Q1" can be defined as "Fame Rate—29.97; Compression—None; X-Pixels 720; Y-Pixels 486"; quality factor "Q2" can be defined as "Frame Rate—29.97; Compression—2:1; X-Pixels 720; Y-Pixels 486"; and quality factor "Q3" can be defined as "Frame Rate—10; Compression—10:1; X-Pixels 360; Y-Pixels 243".

The actual ranking of various qualities is not generally fixed, as the relative ranking of different resolutions of data can differ, depending upon the use to which the data is put. Instead, the ranking of qualities is defined, as required, by each information consumer 140 which supplies quality comparison heuristics in it's QFX to the quality matching engine and these heuristics are used to rank available qualities for that information consumer 140. It should be noted that the quality ID is not used for ranking purposes and one information consumer 140 can rank the qualities defined above from best to worst as Q3, Q2 and Q1, whereas a different information consumer could choose the opposite ranking for its purposes.

As mentioned above, the number of defined quality factors is not limited and the number and/or definitions of quality factors can be changed, as appropriate. The parameters used in defining quality factors can include any suitable quality-related criteria including, for example, bit depth, sample rate, color space, pixel resolution, compression ratio, etc. The types (int, float, string, etc.) of parameters used in defining a quality factor are unlimited as the user can define their own parameter types. The quality matching service employs the quality comparison heuristics of the QFX for an information consumer 140 to process a request by that information consumer 140 for information at a specific quality and time. This service provides one of the following results in response to an information request:

(i) information which exactly matches the requested quality;

(ii) information which does not exactly match the requested quality but which is determined to be a suitable substitute;

(iii) no information, as no suitable information is available at the requested time (i.e.—information is available but should not be used); and (iv) no information available at the requested time.

The first two results each include the information necessary for the requesting information consumer 140 to access the digital source information file 100 which contains a stream 104 including the desired digital information including: the time offset into the stream 104; the duration of the match available from that stream 104 data source; the quality factor ID of the matching quality; and an indication of the type of match (exact, approximate, etc.). The case of non-time-based media (e.g. multi-quality still image data, multi-quality still image data, multi-resolution geometric models, etc.) is handled as a simplified case, as will be apparent to those of skill in the art.

The latter two results each include a tag which identifies to the requesting information consumer that a suitable match to the requested information is not available.

As presently implemented, each information consumer 140 supplies three quality comparison heuristics to the quality matching service in QFE 136:

1) a test to determine if a given candidate quality factor is considered an exact match to a given, requested quality factor;

2) a test to determine if a given candidate quality factor which is not an exact match is considered close enough to a given requested quality to use; and 3) a test to determine which of two candidate quality factors is considered a closer match to a given requested quality factor.

When an information consumer 140 requests information from information manager 108, it specifies the desired quality (and time, for time-based information), the quality matching service in QFE 136 then follows several steps to find an identification block 144 that can supply information at a suitable quality. First the service applies the first heuristic listed above to determine if any of the qualities in the information manager 108 are an exact match, and stops if it finds one.

In the event that no exact match is located, the service applies the second heuristic listed above on each identification block 144 in the specified channel, and time window to eliminate from the list of candidates any identification blocks 144 which are not close enough to be used. Next, if there is more than one possible candidate, the service applies the third heuristic listed above on each candidate identification block 144 to compare it against the closest match found so far with respect to the requested quality, initially comparing the first two remaining candidates and subsequently comparing the Nth candidate against the closest candidate found in previous steps, until it finds the closest match. The quality matching service takes into consideration missing digital information or "holes" so that the above tests are only invoked for time regions of a candidate where data is available.

Figure 7:
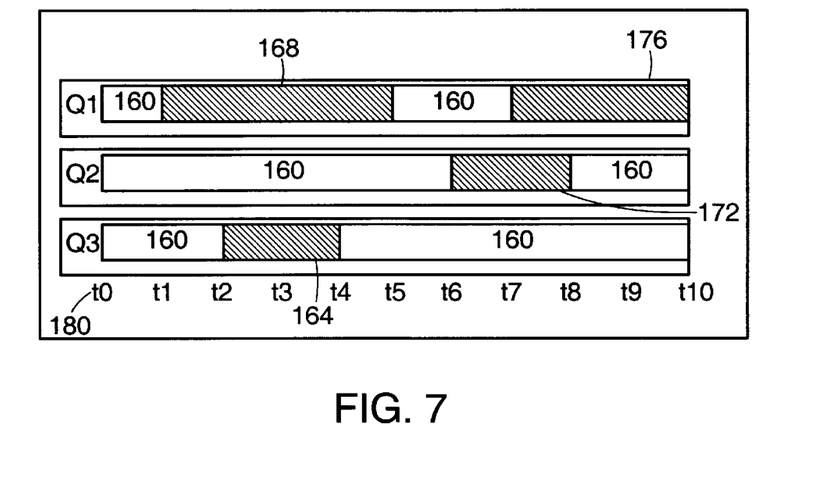
FIG. 7 shows a set of identification blocks in a channel of an information manager in accordance with an embodiment of the present invention.

In FIG. 7, which shows a single channel from an information manager 108 (not shown) information is available at three different quality factors Q1, Q2 and Q3, as indicated by the shaded areas, and "holes" 160 indicate where no information is presently available. The service also takes into consideration the duration of each portion of information at each quality factor to ensure that it provides an information consumer 140 with a duration of a given match which ends no later than the time at which the heuristics would choose a different quality match or at the time that the matching information. For example, in FIG. 7 if a request is made for digital source information at a given quality from t6 to t10, and if quality Q2 is an acceptable match and quality Q1 is a closer match, the quality match service will respond to the request with the information represented by block 172 for time t6 to t7 and will require the information consumer to make another request for time t7 onwards, as the information represented by block 176 is also available at that point in time.

In FIG. 7, identification block 164 represents a portion of digital video information which is available at quality factor Q3 from time t2 to t4, identification block 168 represents a portion of the same digital video information which is available at quality factor Q1 from time t1 to t5, identification block 172 represents a portion of the same digital video information which is available at quality factor Q2 from time t6 to t8, and identification block 176 represents a portion of the same digital video information which is available at quality factor Q1 from time t7 to t10. As can also be discerned from the Figure, the identification blocks 164 and 168 represent digital video information which occurs before the digital video information represented by identification blocks 172 and 176, as indicated by their relative positioning on time axis 180. In this example, quality factor Q1 is defined as "Frame Rate—29.97; Compression—None; X-Pixels 720; Y-Pixels 486"; Q2 is defined as "Frame Rate—29.97; Compression—2:1; X-Pixels 720; Y-Pixels 486"; and Q3 is defined as "Frame Rate—10; Compression—10:1; X-Pixels 360; Y-Pixels 243".

As will be apparent, there is a one second gap from time t=5 to time t=6 where no digital video information is presently available, and each identification block covers a different time span of the digital video information, with some overlap between identification blocks 164 and 168 and between identification blocks 172 and 176. For reasons of clarity, only four identification blocks and three quality factors are shown in FIG. 7, but it will be understood by those of skill in the art that multiple identification blocks and/or quality factors can be present within a channel.

For this example, assume that an information consumer 140 requests digital video information from the channel represented in FIG. 7 for a time window of from t=1 to t=10 at a desired quality of "$Q_{request}$=Frame Rate—29.97; Compression—2:1; X-Pixels 720; Y-Pixels 486; 32 bits per pixel". Also, assume that the information consumer 140 has defined within its QFX the following quality comparison heuristics, wherein $Q_x$ and/or $Q_y$ are quality factors of candidate identification blocks:

(i) a $Q_{request}$ is considered an exact match of a $Q_x$ if the frame rate, compression ratio and X and Y dimension are the same;

(ii) any $Q_x$ is not a close enough approximation of $Q_{request}$ if the frame rate of $Q_x$ is not the same as the frame rate of $Q_{request}$.

(iii) any $Q_x$ is considered a closer quality match to a $Q_{request}$ than $Q_y$ if the difference between the compression ratio of $Q_x$ and $Q_{request}$ is less than the difference between the compression ratio of $Q_y$ and $Q_{request}$.

As can be seen, by applying these heuristics, the quality matching service will return the following results in response to any request for this channel, from t1 to t10 at the given $Q_{request}$:

| Time Request: | Result: |
|---|---|
| t = 1 | Q1, identification block 168, approximating match, match duration 4 (to t = 5) |
| t = 2 | Q1, identification block 168, approximating match, match duration 3 (to t = 5) |
| t = 3 | Q1, identification block 168, approximating match, match duration 2 (to t = 5) |
| t = 4 | Q1, identification block 168, approximating match, match duration 1 (to t = 5) |
| t = 5 | special tag - no data presently available, match duration 1 (to t = 6) |
| t = 6 | Q2, identification block 172, exact match, match duration 2 (to t = 8) |
| t = 7 | Q2, identification block 172, exact match, match duration 1 (to t = 8) |
| t = 8 | Q1, identification block 176, approximating match, match duration 2 (to t = 10) |
| t = 9 | Q1, identification block 176, approximating match, match duration 1 (to t = 10) |
| t = 10 | error - request past end of time axis in information manager. |

It should be noted that, in this example $Q_{request}$ included a quality parameter "32 bits per pixel" which was not considered by the quality matching service, hence an "exact match" was found between the requested quality and Q1 even though the quality factor parameters were not identical—i.e. the parameters required for an "exact match" are defined be the information consumer. Also note that identification block 164 does not provide a close enough match because Q3 has a different frame rate than $Q_{request}$ and hence it is not included in any response.

Various novel quality matching techniques for various data types can be built upon this quality matching infrastructure, such as those described below.

Quality Factor Engine 136 can also provide information to an information consumer 140 to advise a user what type of match has been performed. For example, in a present embodiment of the invention used in a post production NLE-editor, the user specifies a video information quality preference for editing the project, and specifies whether to use the "best" quality information available or to only use information which exactly matches the preferred quality. The video clip object (which in this case is the information consumer 140) which appears on the NLE timeline to represent the information presents the user with a graphical indication (e.g. a colored dot) on the video clip object that indicates whether the clip has digital video information available at exactly the preferred quality (green dot), at an approximating quality (blue dot), or has no media presently available (red dot). Alternatively, a bar or line can be placed on each clip object in the user interface, the bar or line being appropriately colored to indicate the quality match result for each portion of the clip.

If managed information is a digital geometric model used for three-dimensional modeling, the quality factors can relate to multiple levels of detail of the given three dimensional object, i.e. using a different tessellation size (e.g. a different number of polygons) to approximate the surface of the object. The quality matching service can have a set of heuristics defined for such uses to include a consideration of the viewing distance to the three-dimensional object such that objects which are more distant from the viewer can be approximated with lower quality information than those closer to the viewer. In a similar manner, other appropriate heuristics can be employed for different data types.

In addition to providing management of the storage of digital source information on a storage means, information manager 108 can also be employed to implement information caching. For example, it is not uncommon when editing multimedia data that an effect, such as a dissolve between two video clips, need be produced for incorporation in the edit. Such effects are generally computationally expensive to implement and can not always be rendered in real time. In the present invention, such effects can be rendered and stored in a digital source information file 104 and the original digital source information can be revised, transparently to the user, to include the rendered effect.

The rendering cache subsystem of a multimedia authoring software application can utilize an information manager 108 to manage these intermediate renderings of an edit which are generated by the authoring application. This utilizes the ability of an information manager 108 to supply the digital source information that was most recently added to it. As mentioned above, when a user creates a multimedia project, the user typically goes through a repetitive process of editing various portions of the work in progress, rendering portions which can not be played in real time because complex effects have been layered upon the source information or previous renderings have been invalidated by more recent edits, and then playing back the rendered portions to preview the current work. The rendering cache subsystem can utilize an information manager 108 to manage these intermediate renderings as follows:

(i) each time a portion of the multimedia project is rendered, the rendering cache subsystem adds the new digital source information to the cache information manager source corresponding to the more recent renderings of the project;

(ii) the information manager 108 keeps track of the order in which the digital source information is added, in the manner described above, stacking the entries;and (iii) when a user attempts to preview or render any portion of the current work, the various information consumers 140 access information manager 108 to obtain access to the most recently rendered data (i.e.—that not occluded).

Finally, each information consumer 140 uses a QFX to select one out of possibly many qualities of cached renderings. This QFX is similar to the one used for selecting digital source information qualities, as described above. Thus, this caching mechanism supports multi-quality caching and this novel mechanism allows a user to do a fast low-quality rendering and preview it, and later perform high quality renderings of the portions the user decides to keep. It will be apparent to those of skill in the art that, because the QFX performs quality matching of time-based digital information on a sample basis, in the case of digital video editing, for example, this allows cached renderings to differ in quality on a frame-by-frame basis. This permits the user to continue working with some effects rendered at low quality while a computationally-intensive high quality rendering process proceeds frame by frame in the background.

It is contemplated that purges of digital source information from system 20 will be performed, as desired, at user selected or initiated intervals. Purging can be viewed as the inverse of capturing information to be managed by information manager 108. Purging digital information is achieved by removing the DSI record and identification block for the information from information manager 108 and by deleting the digital source information file 100.

This invention provides several mechanisms by which digital information is purged from system 20. In a first case, a user may wish to purge all information associated with an information consumer, in which case the information manager can enumerate all DSI records at all qualities that are accessed by that information consumer to a purge subsystem which can then purge all those DSI records, identification blocks and digital source information files.

In another case, digital source information which has been occluded by more recent information should periodically be purged. Information manager can examine the stacked identification blocks within channels and quality levels in the data cube to determine which information is entirely occluded and this information can be enumerated to a purge subsystem. As a related step, information represented by stacked identification blocks can periodically be defragmented, concatenating the non-occluded digital information into a new single digital source file which is added to information manager 108, thereby occluding all previous identification blocks so that they will be purged in the occluded information purge step.

In another case, information managed by information manager 108 may be altered without the use of information manager 108, resulting in an inconsistent representation of the information. For example, the user may manually delete, move, backup, rename etc. digital source information files through a file system browser provided by the operating system, etc. In such a case, a consistency check operation can be performed on information manager 108 to detect the absence of a digital source information file and to provide the user with a suitable indication that a digital source information file is missing, the user then being able to take suitable steps to remedy the situation.

More commonly, in another case a user may wish to purge all digital source information which is no longer being used by any projects. This situation can arise, for example, if the user deletes a project without purging the associated digital source information. By design, information manager 108 does not maintain keep a record of which information consumers 140 are using it. This is because project files may be deleted, copied or moved through a file system browser without notifying information manager 108, and hence information manager 108 could contain out of date information. Instead, in the present invention digital source information which is no longer being used by any projects is identified by utilizing a unique ID assigned to each information managers and a search engine which is operable to locate them. Specifically, each information manager 108 is assigned a unique ID when it is created and each information consumer 140 keeps a copy of the unique ID of its associated information manager. Starting from a given information manager 108 a determination is made as to which portions (time windows, channels) of the information manager are being used by one or more projects by searching for project files which contain information consumers tagged with the unique ID of the information manager of interest.

If this search finds no project files, then no digital search information files in the given information manager are being used and they may all be purged. If the search finds some project files, unused digital source information within the information manager is then determined to be the set of time and channel regions of the given information manager which are not covered by any of the time and channel windows of the information consumers in the set of found project files. As will be apparent to those of skill in the art, any suitable text indexing and search engine can be employed for searching project files to identify project files which contain the unique ID of a given information manager.

All digital source information that lies exclusively within the unused portions of the information manager determined above may be purged. Any digital information source files which lie partially within the used region of the information manager may be purged by using a suitable file parser to extract the digital information which is used from the digital source information file to create a new digital source information file which is added to information manager 108 while the old digital source information file can be enumerated to the purge subsystem to be removed from system 20.

Thus, purge operations can comprise both the removal of unused complete digital source information files from system 20 and/or the removal of unused portions of digital source information files from system 20.

It is contemplated that, in most circumstances, purge operations will be invoked as two step operations, namely a first step of identifying digital source information which can be purged and a second step of allowing the user to confirm or select which of the enumerated digital source information will in fact be purged. This allows a user to prevent deletion of digital source information which it is contemplated will be needed in the future, but which has not yet been used.

As mentioned above, each DSI record includes an indication of whether it is the primary owner of a stream 104. Digital source information cannot be purged from system 20 if the DSI record defined for it indicates that it is the primary owner of the stream. In situations wherein the digital source is information captured from a video tape or the like, the DSI will indicate that it is not the primary owner of the digital source information, and thus the information can be purged as, should the information be again needed, it can be recaptured from the appropriate source material.

If the digital source information is not available for re-capture (for example it is a computer generated animation sequence which has been rendered to a storage means) or if the digital source information is a web page, etc. the DSI record will indicate that it is the primary owner of the digital source information. In this case, the purge operations will not consider the digital source information as being free to purge, even if it is not in use by an information consumer.

As information manager 108 transparently (to the user) computes the information required to effect the purges, purges can be simply and frequently performed by a user to free storage space on storage means 56 as needed and this encourages efficient use of the space on storage means 56.

In the case of an information manager for a rendering cache, when a project or edit is saved, digital source information which is occluded by more recent information can be automatically purged with no user intervention required.

When a project or edit is saved, information manager 108 can also be saved. If the project or edit has not been saved since it was modified, the user can restore the project or edit to it's last saved state by reloading the last saved project and its information manager.

As will be apparent, as re-capture operations are performed, purge operations can be invoked to remove digital source information which is no longer used, the re-captured information being used in its place.

As mentioned briefly above, a project that has been partially or entirely purged of its digital source information can later be reconstituted by capturing the needed digital source information as enumerated by the information manager or managers for the project. This recapture process is facilitated by the present invention which can enumerate exactly the portion or portions of the source information that needs to be recaptured, according to the following steps:

(i) the user asks the capture system to recapture all needed digital source information so that a set of information consumers in a project has all the digital source information they require at a specified quality;

(ii) the capture system creates a list of all such information consumers in the project, creates a list of each information manager managing the digital source information for at least one of these information consumers and asks each information manager to enumerate its digitization list for the information consumers, passing each information manager the list of information consumers and the specified quality factor for the digital source information;

(iii) each information manager, when given this request, creates a sublist of those information consumers which have its information manager ID, i.e. those which are connected to this information manager;

(iv) the information manager then creates a temporary data cube from the list of information consumers determined in the previous step. This data cube spans the entire set of channels found in this information consumer list, spans the total time windows of all information consumers in the list, and has exactly one quality factor, namely the specified quality of the needed digital source information. The identification blocks in this data cube represent the digital source information that is needed by this list of information consumers determined calculated. It should be noted that information consumers on any given channel which have overlapping time windows are grouped into a identification block, which makes it possible for this invention to enumerate one digitization region for digital source information used by a set of information consumers covering a common region of the information manager;

(v) the information manager then determines the difference between the set of identification blocks in the temporary data cube determined in the previous step and the set of identification blocks in the information manager's permanent data cube (which represents the digital source information it has available). This difference is the set of time regions and channels that are required by the set of information consumers but which the information manager does not have digital source information for. This set of time regions and channels is sorted by channels and by increasing start time values of the information manager, and is enumerated to the capture subsystem as the digitization list;

(vi) the capture subsystem finally asks the user to insert the tape or other source information associated with a given information manager, digitizes the portions of the source material specified in the digitization list from the preceding step and adds DSI records to the information manager for the resulting digital source information files.

These steps result in an efficient recapture process for several reasons: digital source information is only captured once for all information consumers in the project which overlap a given portion of an information manager; any digital source information that is already managed by the information manager will be used by information consumers overlapping that portion of the information manager, even if the DSI records in the information manager only partially overlap with the information consumer; the digitization list is sorted in increasing time order, so the capture system does not perform unnecessary seeks back and forth to capture random portions of the source media; and, if two or more information consumers in a project require digital source information from a series of adjacent sections of the source material, each of these portions is grouped into a single digitization pass (a single file), thereby reducing queuing and pre-roll overhead during the digitization phase.

It is contemplated that another advantage of information manager 108 is that it simplifies the transfer of a project from one system 20 to another, like, system 20. By copying the information manager 108 and transferring information consumers 124 and digital source information files 100, a multimedia editing and/or authoring project can be transferred between systems 20. Similarly, the same information copied to suitable storage means (such as a tape back up, optical disk, etc) can allow interruption of the multimedia editing and/or authoring project, temporarily freeing system 20 for use on another project.

The present invention provides a method and system of managing digital source information which is believed to provide for the efficient management of the use and storage of digital source information on a storage means. The operation of the system is largely transparent to users and yet provides the capability for relatively sophisticated purge operations to be performed, removing unused information, whether an entire digital source information file or only a portion of a file.

The above-described embodiments of the invention are intended to be examples of the present invention and alterations and modifications may be effected thereto, by those of skill in the art, without departing from the scope of the invention which is defined solely by the claims appended hereto.

The above-described embodiments of the invention are intended to be examples of the present invention and alterations and modifications may be effected thereto, by those of skill in the art, without departing from the scope of the invention which is defined solely by the claims appended hereto.

We claim:

1. A method of managing the storage and use of digital information stored on at least one storage means for use by at least one information consumer, comprising the steps of:

storing digital source information files in the at least one storage means, each source information file including at least one stream of digital source information;

creating a digital source information record for each stored digital source information file, each digital source information record including: information to locate the digital source information file on said at least one storage means, an indication of the quality of each stream in the digital source information and an indication of the duration of each stream in the digital source information;

creating and maintaining a multi-dimensional array of information relating to digital source information records, the array indexing each stream in each digital source information record by its quality, by a time axis against which the start and duration of each stream is synchronized and by user defined groupings of streams;

receiving a request from at least one information consumer to use at least a portion of digital source information, the request being specified in terms of said user defined groupings, the desired start time and duration of the information and a desired quality;

processing said request by examining said multi-dimensional array to determine if a stream of said requested digital source information with the requested quality exists;

responding to the information consumer by providing information from a corresponding digital source information record to allow access to at least a portion of a stream representing said identified digital source information when said determination indicates a stream containing the desired digital source information at said requested quality is available; and when said determination indicates that a stream containing said information at said desired quality does not exist, determining if a stream containing the requested digital source information at an acceptable substitute quality exists and responding to the information consumer with information from the digital source record for a determined substitute stream to allow access to at least a portion of said substitute stream representing the requested information at said acceptable substitute quality and, when said determination indicates that the requested information does not exist at an acceptable substitute quality, responding to the information consumer to indicate that the requested information is not available.

2. The method of claim 1 wherein the determination of acceptable substitute qualities is made in accordance with rules supplied by said information consumer.

3. The method of claim 1 wherein the determination of acceptable substitute qualities is predefined for each type of digital source information in said streams.

4. The method of claim 1 wherein the response to an information consumer includes an indication of whether the identified requested information is at the request quality or an acceptable substitute quality.

5. The method of claim 4 wherein said indication comprises a graphical user interface element.

6. The method of claim 1 wherein said multi-dimensional array comprises a first dimension grouping related streams according to a user-defined grouping, a second dimension of said array corresponding to time within said streams and a third dimension of said array corresponding to the quality of the data in said streams.

7. The method of claim 6 wherein said multi-dimensional array includes a fourth dimension corresponding to a defined ordering with which digital source information has been loaded onto said storage means.

8. The method of claim 7 wherein said defined ordering represents the time at which the digital source information has been rendered.

9. The method of claim 1 wherein a determination can be made of all digital source information which is not being used by an information consumer and said determination being employed to remove unused digital source information from said storage means.

10. The method of claim 9 wherein said storage means comprises at least two storage devices.

11. The method of claim 1 further including the step of, when requested digital source information is not available at a requested quality or at an acceptable substitute quality, providing a user with an indication of digital source information and the requested quality of the information which is required to be loaded onto said storage means.

12. The method of claim 1 wherein said digital source information files comprise intermediate renderings of effects and the like.

13. The method of claim 12 wherein said multi-dimensional array includes a fourth dimension which corresponds to the time at which the digital source information has been loaded on to said storage means.

14. The method of claim 13 wherein said intermediate renderings are present at multiple qualities.

15. A system for managing the storage and use of digital information comprising digital source information files each including at least one stream of data, comprising:

storage means to store digital source information files;

at least one information manager to control access to and storage of said digital source information files, each information manager including a digital source information record pool to create and maintain a digital source information record for each digital source information file, a multi-dimensional array to index the digital source information records in said pool by a user defined grouping, by the quality of the information in the stream in the digital source information and by a common time reference for the start time and duration of the stream;

at least one information consumer to communicate with the information manager to request access to digital source information therefrom at a specified quality and for a specified duration; and a quality matching engine to determine if digital source information is available at a requested quality and to determine if digital source information is available at an acceptable substitute quality if digital source information is not available at said requested quality.

16. The system according to claim 15 wherein said storage means comprises at least two storage devices.

17. The system of claim 16 wherein at least one of said at least two storage device is connected to said system via a communications network.

18. The system according to claim 15 wherein said determination of acceptable substitute quality is performed in accordance with criteria supplied by said information consumer.

19. The system of claim 15 wherein said multi-dimensional array include a first axis to arrange streams according to user defined groupings, a second axis to arrange streams relative to a common time and a third axis to arrange streams by their quality.

20. The system of claim 15 wherein said multi-dimensional array includes a fourth axis to arrange said streams according to a determined ordering.

21. The system of claim 20 wherein said determined ordering is the time at which each respective stream is rendered.

* * * * *